US007075655B2

(12) United States Patent
Morris

(10) Patent No.: US 7,075,655 B2
(45) Date of Patent: Jul. 11, 2006

(54) ALIGNMENT SELF CHECK FOR A WAVELENGTH METER

(75) Inventor: Michael B. North Morris, Tucson, AZ (US)

(73) Assignee: Agilent Technologies, Inc., Palo Alto, CA (US)

( * ) Notice: Subject to any disclaimer, the term of this patent is extended or adjusted under 35 U.S.C. 154(b) by 427 days.

(21) Appl. No.: 10/669,035

(22) Filed: Sep. 23, 2003

(65) Prior Publication Data

US 2005/0062975 A1 Mar. 24, 2005

(51) Int. Cl.
*G01B 9/02* (2006.01)

(52) U.S. Cl. ...................................... 356/451; 356/450

(58) Field of Classification Search ........ 356/450–456, 356/508, 510
See application file for complete search history.

(56) References Cited

U.S. PATENT DOCUMENTS

| | | | | |
|---|---|---|---|---|
| 4,444,501 | A * | 4/1984 | Schwiesow | 356/452 |
| 5,657,122 | A * | 8/1997 | Curbelo et al. | 356/452 |
| 6,219,146 | B1 * | 4/2001 | Innes et al. | 356/508 |
| 2003/0058452 | A1 | 3/2003 | Morris et al. | |

OTHER PUBLICATIONS

Dennis Derickson, “Fiber Optic Test and Measurement”, Prentice Hall, Inc., 1998, pp. 133-141.

“Agilent 86120C Multi-Wavelength meter Technical Specifications,” available from Agilent Technologies as Publication No. 5968-1045E, Mar. 2000.

* cited by examiner

*Primary Examiner*—Hwa Andrew Lee

(57) ABSTRACT

An alignment self check of a wavelength meter is performed. A reference signal is placed into a reference signal path of the wavelength meter. The reference signal is also placed into an unknown signal path of the wavelength meter. It is then detected whether after traveling through the unknown signal path, the reference signal has a same period as after traveling through the reference signal path.

20 Claims, 4 Drawing Sheets

ALIGNMENT SELF CHECK FOR A WAVELENGTH METER

BACKGROUND

The present invention concerns signal test and measurement and pertains particularly to alignment self check for a wavelength meter.

In a Michelson interferometer system, light from a fiber optic input is collimated and directed to the input of the interferometer. The light from a fiber optic input is split into two paths with a beam splitter to form two beams. Both beams are then reflected by mirrors that redirect the light back toward the beam splitter. One portion of the light reflected from the mirrors goes back toward the input of the interferometer. The other portion of the light is incident on a photodetector. Assuming there is no loss in the interferometer, all of the light is directed to either the photodetector or toward the input of the interferometer.

One mirror of the interferometer is stationary and one is movable. The movable mirror varies the length that the beam travels before and after incidence with the movable mirror. As the mirror is moved, the amount of light reaching the photodetector oscillates up and down because of constructive and destructive interference effects between the two paths of the interferometer. Through the analysis of these interference patterns, the wavelength of light can be calculated.

The beams of light can be analyzed in terms of light interfering as the path length in the interferometer changes. This is referred to as the fringe-counting description of wavelength meter operation. Alternately, if the movable mirror is moved at a constant rate, the frequency of the light in the beam is Doppler-frequency shifted. A Doppler detector then mixes the light from the moveable mirror and the stationary mirror. A resulting beat frequency between these two signals can be used to calculate the unknown frequency of the input signal. See Dennis Derickson, *Fiber Optic Test and Measurement*, Prentice Hall, Inc., 1998, pp. 133–141.

A Michelson interferometer based wavelength meter measures the wavelength of an unknown signal by comparing a fringe pattern produced by the unknown signal with that of the reference (known) signal. As one arm of the Michelson interferometer is translated (i.e., the mirror is moved) the interference pattern at the photodetector oscillates between high and low irradiance. Comparing the number of fringes produced by the unknown signal with the number produced by the known signal results in a highly accurate estimate of the unknown wavelength. The accuracy of the measurement can be further increased by multiplying the frequency of the fringes electronically with a phase locked loop.

Unfortunately, the measurement accuracy of a Michelson interferometer can be significantly reduced if the unknown signal and known signal are not aligned with one other. The alignment of the interferometer can degrade over time due to shock, vibration and stress due to thermal expansion.

SUMMARY OF THE INVENTION

In accordance with an embodiment of the present invention, an alignment self check of a wavelength meter is performed. A reference signal is placed into a reference signal path of the wavelength meter. The reference signal is also placed into an unknown signal path of the wavelength meter. It is then detected whether after traveling through the unknown signal path, the reference signal has a same period as after traveling through the reference signal path.

DETAILED DESCRIPTION OF EMBODIMENTS OF THE INVENTION

Figure 1:
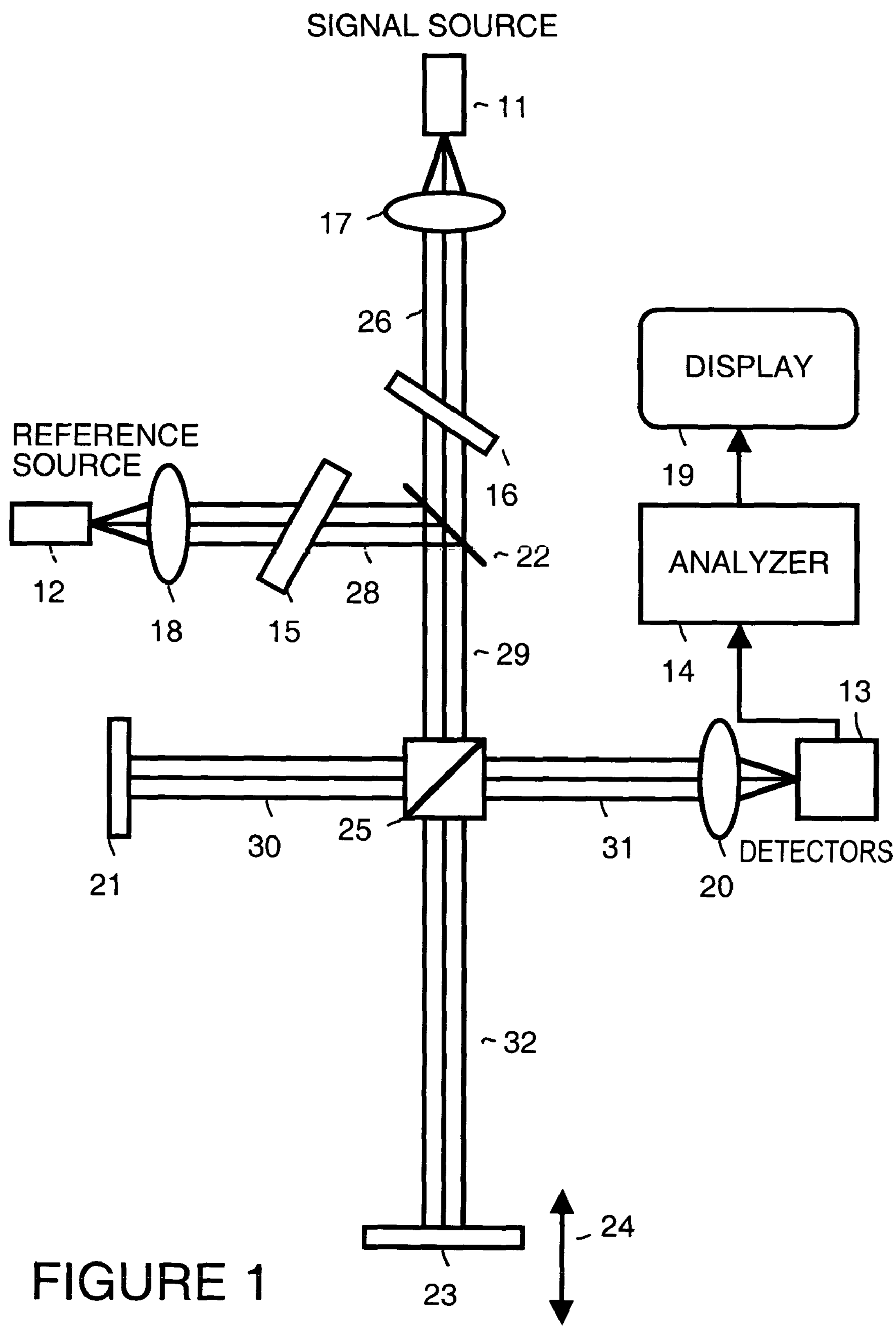
FIG. 1 is a simplified block diagram of a Michelson interferometer based wavelength meter.

FIG. 1 is a simplified block diagram of a Michelson interferometer based wavelength meter. A signal source 11 is the source of an "unknown" signal with an unknown wavelength. For example, signal source 11 is an optical fiber carrying a light signal. A collimating lens 17 collimates the light from signal source 11 to produce a beam 26. For example, collimating lens 17 is a 7.5 millimeter (mm) focal length lens.

A reference source 12 is the source of a reference signal with a known wavelength. A collimating lens 18 collimates the light from reference source 12. For example, collimating lens 18 is a 6.0 mm focal length lens. A resulting reference beam 28 is in a different plane than beam 26. For example, beam 26 is in a higher parallel plane than reference beam 28. A fold mirror 22 is in the same plane as reference beam 28 and reflects beam 28 to run in parallel with beam 26 along a beam path 29. Beam 26 is not in the same plane as fold mirror 22 and so is unaffected by (i.e., passes over) fold mirror 22.

A beam splitter 25 splits beam 26 and reference beam 28 so that a portion of each beam runs along a beam path 30, is reflected by a corner cube mirror 21 and returns to beam splitter 25 along beam path 30. The remaining portion of each beam runs along a beam path 32, is reflected by a corner cube mirror 23 and returns to beam splitter 25 along beam path 32. The beams switch planes at the corner cube mirrors.

After returning to beam splitter 25, a portion of each beam travels back along beam path 29 and a portion of each beam is directed to beam path 31 through imaging lenses 20 to detector 13. In the shown embodiment, lenses 20 are two lenses, one for each beam, and detector 13 includes two detectors, one for each beam. For example, each of imaging lenses 20 is a 25.4 mm focal length lens.

A portion of the beam in the lower plane is reflected by fold mirror 22 towards collimating lens 18. This beam in the lower plane originates from signal source 11. A high pass filter 15 blocks the reflected beam from reaching collimating lens 18.

A portion of the beam in the higher parallel plane passes over fold mirror 22 and continues towards collimating lens 17. This beam in the higher parallel plane originated from reference source 12. A low pass filter 16 blocks this beam from reaching collimating lens 17.

The beams of light detected by detector 13 can be analyzed in terms of light interfering as the path length in the interferometer changes. As corner cube mirror 23 is translated (moved), as represented by an arrow 24, the interference patterns at detector 13 oscillate between high and low irradiance. For example, an analyzer 14 compares the number of fringes produced by the unknown signal with the number produced by the reference signal results in a highly accurate estimate of the wavelength of the unknown signal. Results can be displayed on a display 19 or sent to a host system for further analysis and/or display.

The measurement accuracy of a Michelson interferometer can be significantly reduced if the unknown signal and the reference signal are not precisely aligned with one another. The alignment of, for example, signal source 11 relative to collimating lens 32 which in combination determine the angle of beam path 32 relative to the axis of translation can degrade over time due to shock, vibration and stress due to thermal expansion. While the wavemeter provides accurate measurements when the reference and unknown beams are aligned with one another and are not aligned with an axis of translation within the interferometer, in this case the performance degrades more rapidly if the alignment changes due to shock, vibration, thermal expansion or other mechanical or environmental influences.

Figure 2:
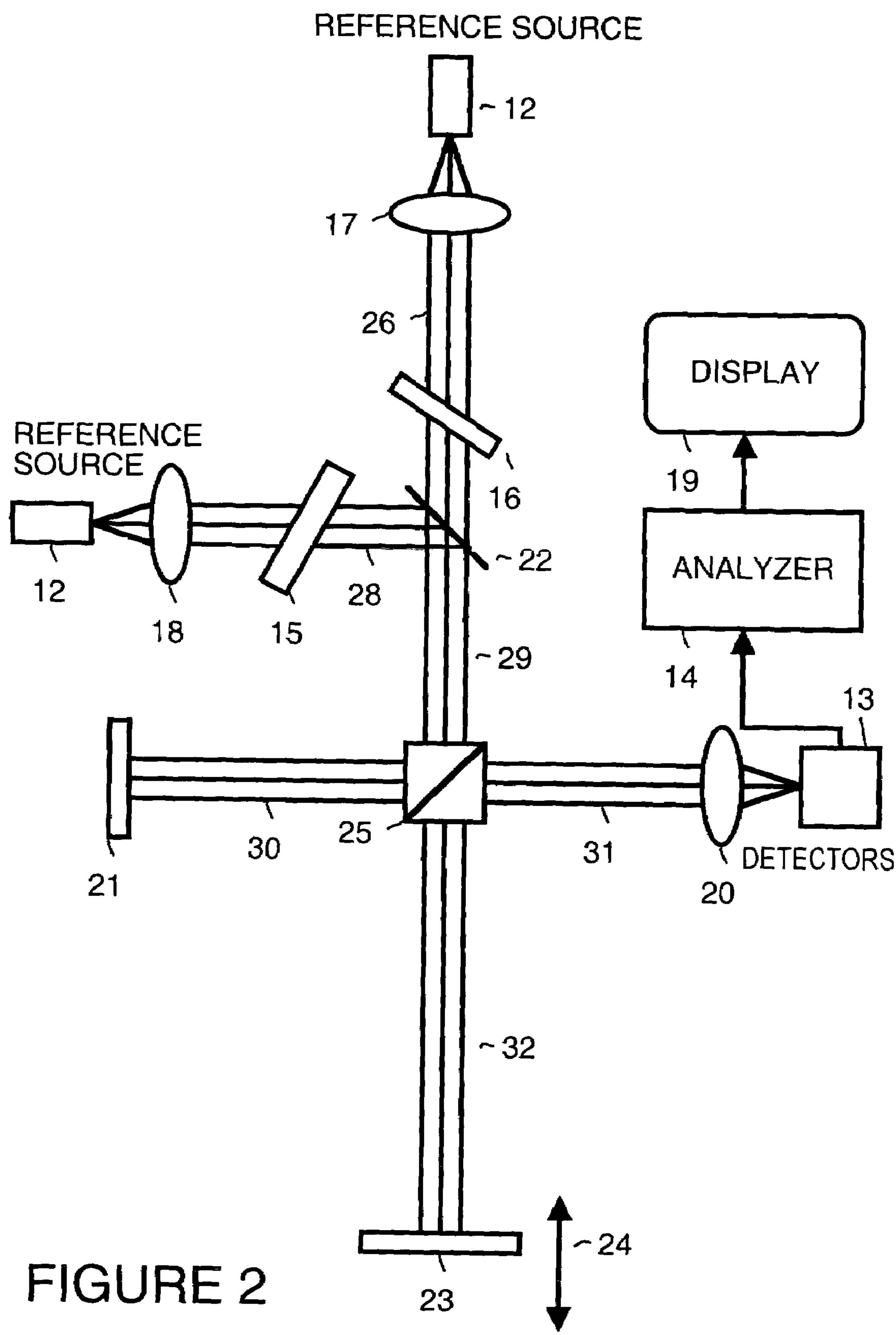
FIG. 2 is the simplified block diagram of a Michelson interferometer based wavelength meter shown in FIG. 1 configured for an alignment self check in accordance with an embodiment of the present invention.

FIG. 2 shows the Michelson interferometer based wavelength meter shown in FIG. 1 configured for an alignment self check. Signal source 11 has been replaced with reference source 12. Thus, the reference source is used on both signal paths. For clarity, the reference signal propagating along the original reference signal path is referred to as reference signal P1. The reference signal propagating along the path originally used for the unknown signal is referred to as reference signal P2.

Reference signal P1 and reference signal P2 are each detected by one of the detectors within detector 13. During self-alignment, at detector 13, reference signal P2 is sampled once per cycle of reference signal P1. Analyzer 14 determines that beam path 32 and corner cube mirror 23 are correctly aligned when the sampled amplitude value of reference signal P2 at detector 13 are constant. The constant sampled amplitude indicates reference signal P1 and reference signal P2 have the same period.

Analyzer 14 determines the signal paths of reference signal P1 and reference signal P2 are incorrectly aligned with respect to each other when the sampled amplitude values (aliased signal) of reference signal P2 is a low frequency sine wave. Detection of such a low frequency sine wave indicates reference signal P1 and reference signal P2 at detector 13 have a different period. This is illustrated by FIG. 3.

Figure 3:
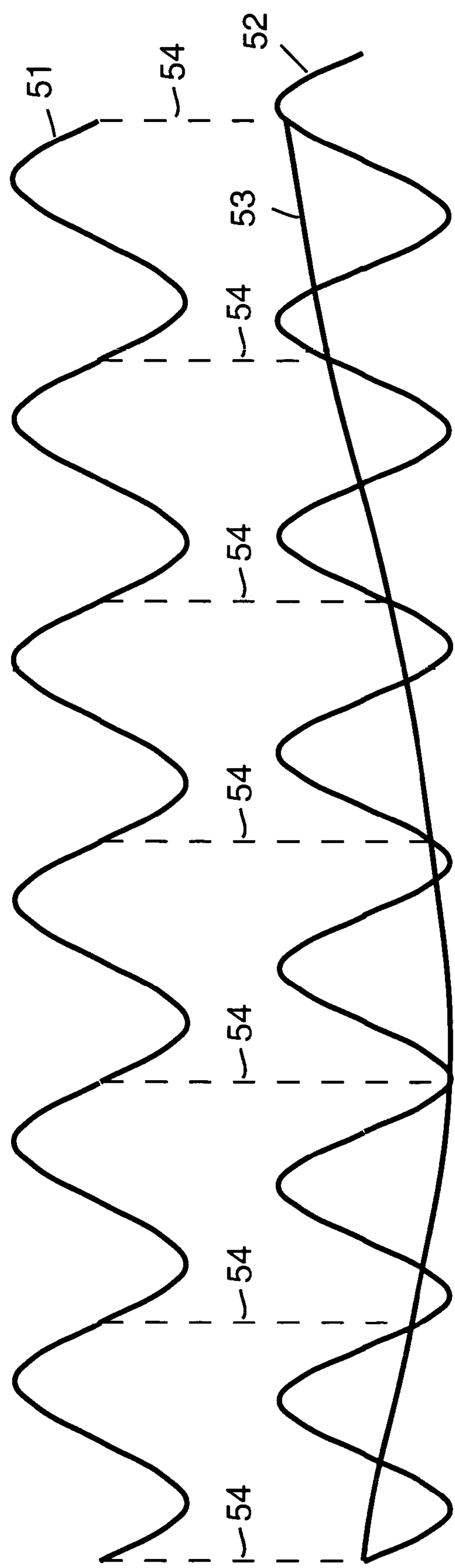
FIG. 3 is a diagram used to illustrate an example of an alignment self check in accordance with an embodiment of the present invention.

In FIG. 3, waveform 51 represents reference signal P1 as detected at detector 13. Waveform 52 represents reference signal P2 as detected at detector 13. Vertical lines 54 show sampling times of reference signal P2. Waveform 53 is the waveform of the aliased signal that results from sampling amplitude of reference signal P2 once per cycle of reference signal P1.

Figure 4:
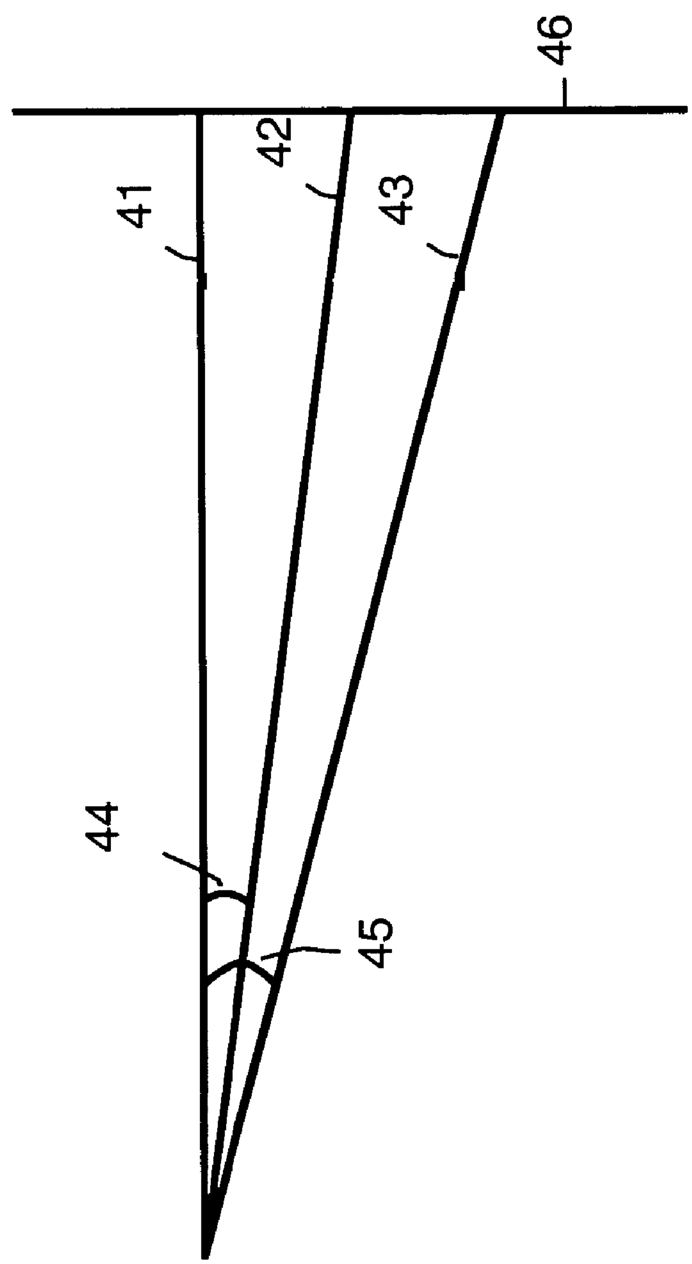
FIG. 4 is another diagram used to illustrate an example of an alignment self check in accordance with an embodiment of the present invention.

FIG. 4 shows a path 41 perpendicular to a plane 46. Path 41 represents the ideal beam path 32. Angle 44 ($\alpha$) represents the angle at which a path 42 of reference signal P1 varies from path 41. Angle 45 ($\beta$) represents the angle at which a path 43 of reference signal P2 varies from path 41.

If $\lambda_R$ represents the period of reference signal P1, then the period of reference signal P2 is equal to $\lambda_R$ $(\cos(\alpha)/\cos(\beta))$. The spatial frequency ($\xi$) between reference signal P1 and reference signal P2 is given in Equation 1 below:

$$\xi = \frac{1}{\lambda_R} - \frac{1}{\lambda_R \frac{\cos(\alpha)}{\cos(\beta)}} = \frac{\frac{\cos(\alpha)}{\cos(\beta)} - 1}{\lambda_R \frac{\cos(\alpha)}{\cos(\beta)}} \quad \text{Equation 1}$$

If the absolute value of the difference between angle 44 ($\alpha$) and angle 45 ($\beta$) is small, only a fraction of the aliased signal might be sampled even though a large number of samples are taken.

By way of example, for one embodiment of the present invention, for each alignment self check, $2^{18}$ samples are taken of reference signal P2. One sample is taken per cycle of reference signal P1. It is assumed that a least squares fit can accurately predict the spatial period ($1/\xi$) of waveform 53 if one twentieth of the spatial period ($1/\xi$) is sampled. Presuming $2^{18}$ samples of reference signal P2 represent one twentieth of the spatial period ($1/\xi$), then Equations 2 below can be used to calculate the potential error in measurement. For example, the samples are taken as corner cube mirror is translated through its full range of motion.

$$\frac{1}{20} \cdot \frac{1}{\xi} = 2^{18}\lambda_R \quad \text{Equation 2}$$

$$20 \cdot 2^{18}\lambda_R = \frac{1}{\xi} = \lambda_R \frac{\frac{\cos(\alpha)}{\cos(\beta)}}{\frac{\cos(\alpha)}{\cos(\beta)} - 1}$$

$$\frac{\cos(\alpha)}{\cos(\beta)}(20 \cdot 2^{18}) - 20 \cdot 2^{18} = \frac{\cos(\alpha)}{\cos(\beta)}$$

$$\frac{\cos(\alpha)}{\cos(\beta)} = 1.0000001907$$

Equations 2 indicate that, for the given example, errors are detectable to approximately 0.1907 parts per million (PPM). If the value of angle 45 ($\beta$) is equal to twice the value of angle 44 ($\alpha$), then angle 44 ($\alpha$) is known within approximately 0.36 milliradians.

If an alignment self check indicates that the sampled amplitude value of reference signal P2 varies more than a predefined threshold, the user is notified that the self-alignment test of the wavelength meter has failed. For example, an error or warning message is placed on display 19 or forwarded to a host system. The user then knows that results for the wavelength meter may be inaccurate. If the alignment self check indicates that the sampled amplitude value of reference signal P2 is constant, normal operation of the wavelength meter proceeds.

In alternative embodiments of the present invention, the wavelength meter could self-adjust to correct errors in alignment. Fur example, misalignment results from an error in alignment of a source relative to a collimating len. A lateral shift in the source for a beam path translates to an angular deviation of the beam path. During self-alignment, the source is correctly aligned relative to the collimating lens for the beam path.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for performing an alignment check of a wavelength meter that analyzes an interference pattern created by a reference signal with a known wavelength and a source signal with an unknown wavelength, the reference signal traveling in a reference signal path and the source signal traveling in a source signal path, the method comprising:

(a) placing the reference signal into the a reference signal path of the wavelength meter;

(b) replacing the source signal with the reference signal so that the reference signal is placed into the source signal path of the wavelength meter; and, (c) detecting whether after traveling through the source signal path, the reference signal has a same period as after traveling through the reference signal path.

2. A method as in claim 1 wherein (c) includes:

sampling values of the reference signal after traveling through the source signal path, based on frequency of the reference signal after traveling through the reference signal path to determine whether the sampled values are at constant amplitude.

3. A method as in claim 1 additionally comprising:

(d) notifying a user of the wavelength meter when after traveling through the source signal path, the reference signal has a different period than after traveling through the reference signal path.

4. A method as in claim 1 additionally comprising:

(d) performing realignment of the wavelength meter when after traveling through the source signal path, the reference signal has a different period than after traveling through the reference signal path.

5. A method as in claim 1 wherein the wavelength meter includes a Michelson interferometer.

6. A method as in claim 1 additionally comprising:

translating a mirror in both the source signal path and in the reference signal path while detecting whether after traveling through the source signal path, the reference signal has the same period as after traveling through the reference signal path.

7. A wavelength meter comprising:

a reference signal path;

a source signal path;

a detector that detects signal activity on the reference signal path and signal activity on the source signal path;

a signal source that places a source signal with an unknown wavelength on the source signal path;

a reference source that places a reference signal with a known wavelength on the reference signal path, wherein the reference source is able to also place the reference signal on the source signal path in order to perform an alignment check of the wavelength meter; and, an analyzer that determines whether, after traveling through the source signal path, the reference signal has a same period as after traveling through the reference signal path.

8. A wavelength meter as in claim 7 wherein the analyzer checks values of the reference signal sampled by the detector after traveling through the source signal path, based on frequency of the reference signal after traveling through the reference signal path, to determine whether the sampled values are at constant amplitude.

9. A wavelength meter as in claim 7 wherein the wavelength meter notifies a user of the wavelength meter when after traveling through the source signal path, the reference signal has a different period than after traveling through the reference signal path.

10. A wavelength meter as in claim 7 wherein the wavelength meter performs realignment of the wavelength meter when after traveling through the source signal path, the reference signal has a different period than after traveling through the reference signal path.

11. A wavelength meter as in claim 7 wherein the wavelength meter includes a Michelson interferometer.

12. A wavelength meter as in claim 7 wherein the analyzer checks values of the reference signal sampled by the detector to determine whether the sampled values are at constant amplitude.

13. A wavelength meter as in claim 7 wherein the wavelength meter includes a mirror that is translated while the detector detects signal activity on the reference signal path and signal activity on the source signal path.

14. A wavelength meter comprising:

reference signal path means for guiding a signal;

source signal path means for guiding a signal;

detector means for detecting signal activity on the reference signal path means and signal activity on the source signal path means;

means for placing a source signal with an unknown wavelength on the source signal path means;

means for placing a reference signal with a known wavelength on the reference signal path means and for placing the reference signal on the source signal path means in order to perform an alignment check of the wavelength meter; and, analyzer means for determining whether, after traveling through the source signal path means, a reference signal has a same period as after traveling through the reference signal path means.

15. A wavelength meter as in claim 14 wherein the analyzer means checks values of the reference signal sampled by the detector means after traveling through the source signal path means, based on frequency of the reference signal after traveling through the reference signal path means, to determine whether the sampled values are at constant amplitude.

16. A wavelength meter as in claim 14 wherein the wavelength meter notifies a user of the wavelength meter when after traveling through the source signal path means, the reference signal has a different period than after traveling through the reference signal path means.

17. A wavelength meter as in claim 14 wherein the wavelength meter performs realignment of the wavelength meter when after traveling through the source signal path means, the reference signal has a different period than after traveling through the reference signal path means.

18. A wavelength meter as in claim 14 wherein the wavelength meter includes a Michelson interferometer.

19. A wavelength meter as in claim 14 wherein the analyzer means is also for checking values of the reference signal sampled by the detector means to determine whether the sampled values are at constant amplitude.

20. A wavelength meter as in claim 14 wherein the wavelength meter includes a mirror that is translated while the detector means detects signal activity on the reference signal path means and signal activity on the source signal path means.

* * * * *

UNITED STATES PATENT AND TRADEMARK OFFICE

CERTIFICATE OF CORRECTION

PATENT NO. : 7,075,655 B2
APPLICATION NO. : 10/669035
DATED : July 11, 2006
INVENTOR(S) : Morris It is certified that error appears in the above-identified patent and that said Letters Patent is hereby corrected as shown below:

On the face page, in field (56), under “Other Publications”, in column 2, line 3, delete “meter” and insert -- Meter --, therefor.

On the Title page, in field (56), under “Other Publications”, in column 2, line 5, delete “No.” and insert -- No., --, therefor.

On the Title page, under “Primary Examiner”, in column 2, line 1, delete “Hwa Andrew Lee” and insert -- Andrew Hwa Lee --, therefor.

In column 5, line 11, in Claim 1, after “into the” delete “a”.

Signed and Sealed this

Nineteenth Day of December, 2006

JON W. DUDAS
*Director of the United States Patent and Trademark Office*